United States Patent [19]

Strub

[11] 4,045,348
[45] Aug. 30, 1977

[54] FILTER PRESS PLATE FOR LAYER AND SETTLING LAYER FILTERS

[75] Inventor: Fritz Strub, St. Gallen, Switzerland

[73] Assignee: Filtrox Maschinenbau AG, St. Gallen, Switzerland

[21] Appl. No.: 630,902

[22] Filed: Nov. 11, 1975

[30] Foreign Application Priority Data

Nov. 15, 1974 Switzerland .................. 15232/74

[51] Int. Cl.² ............................................ B01D 25/12
[52] U.S. Cl. ................................... 210/230; 210/231; 100/115; 100/195; 100/252
[58] Field of Search ............... 210/225, 230, 231, 291, 210/292, 293, 498; 100/115, 125, 252, 113, 194, 195, 198

[56] References Cited

U.S. PATENT DOCUMENTS

| 816,624 | 4/1906 | Wagner | 210/230 |
|---|---|---|---|
| 953,495 | 3/1910 | Stockheim | 210/231 |
| 2,702,126 | 2/1955 | Bennett et al. | 210/231 |
| 3,669,267 | 6/1972 | Hutton | 210/231 |
| 3,850,812 | 11/1974 | Schneider | 210/231 |

FOREIGN PATENT DOCUMENTS 831,618  9/1938  France ........................ 210/231

Primary Examiner—Frank W. Lutter
Assistant Examiner—David L. Lacy
Attorney, Agent, or Firm—William J. Daniel

[57] ABSTRACT

A filter press plate for layer and settling filters having an open frame of stainless steel and at least one partition plate of corrosion resistance material detachably supported within the frame by means of cooperating lugs and recesses on the mutually facing edges of the at least one partition plate and frame, sufficient clearance space being provided between the peripheral edge of the at least one partition plate and the adjacent frame edges as to accommodate any difference in the heat expansions thereof at the maximum temperature to which the filter press plate is to be exposed. The frame includes exteriorly projecting hollow eyes which define manifolds for supplying and removing the liquid to be filtered when a plurality of the elements are stacked together in use. The at least one partition plate is profiled on its opposite side faces to form channels for the liquid being filtered. For large size elements, the frame includes internal struts extending between opposite sides and defining a plurality of internal areas, each having a plate detachably supported therein.

9 Claims, 3 Drawing Figures

FILTER PRESS PLATE FOR LAYER AND SETTLING LAYER FILTERS

The invention relates to a filter press plate for layer and settling layer filters having a press frame of stainless steel with external eyes as well as connection channels between its interior and the eyes for the removal of filtrate or for the supply of nonfiltrate, and within inside the space delimited by the press edge internal side and the two side surfaces of the press edge partition plates, supporting means serving as for the layers of filtering material to be disposed on the two side faces of the press frame.

Filter press plates of this type are generally referred to in filtering technology as steel filter press plates. In these known steel filter plates, the partition plates consist in most cases of two stainless steel perforated plates, arranged on opposite side faces of the press frame and supported one against the other by support elements such as buckle plates, cams or sections, or by means of supporting elements arrange between the plates. Generally, the perforated plates are welded at their edges with the press frame.

The filtering properties of these steel filter press plates are generally very good, and in particular steel filter press plates do not suffer from the disadvantage of corrosion, which is the case with cast aluminium filter plates which were in general use formerly and are to some extent even now; nor do they suffer from the disadvantage of defective shape stability in the area of the press frames, which is often observed with the all synthetic plastic material filter plates used increasingly in recent years instead of aluminium filtering press plates. However, it is a disadvantage in layer filters using such steel filtering plates that both at the beginning and the end of each filtering operation there occur relatively high losses through dilution. This is to be attributed to the fact that in steel filter plates the above-mentioned interior space delimited by the interior side and the two side faces of the press frame only contains two perforated plates and therefore is hollow to a large extent. Thus when a filtering operation starts, a relatively great volume of water has to be forced out of the layer filter by the liquid to be filtered flowing behind it, before the liquid leaves the filter in almost clean form, or with only very small admixtures in any of water. The liquid which leaves the filter until this moment, mixed with water, is a loss through dilution. A further loss through dilution occurs on the termination of the filtering process, when the liquid still found in the filter, to be filtered or already filtered, is expelled by water from the filter. In this case also a non inconsiderable loss through dilution occurs.

In contrast, the loss through dilution in the other kinds of filter plates, consisting completely in cast aluminium or synthetic plastic material, is considerably smaller since the interior space is not for the most part hollow but rather filled for the most part with aluminium or plastic material, as these filter plates consist in principle of an aluminium or synthetic plastic material plate with the press in the edge area of the plate and in a ribbed surface in the remaining area of the plate. This known solution of the problem of losses through dilution for cast aluminium or synthetic plastic material filter press plates could not, however, be adapted to steel filter press plates as filter plates which are cast from stainless steel similar to cast aluminium filter plates and made of stainless steel are not corrosion proof because of their porosity and in addition the material costs for making such full steel filter plates of stainless steel are too high. The defective corrosion resistance of cast filter plates of stainless steel may indeed be overcome, in that a rolled steel plate of stainless steel can be given the same shape as a cast aluminium filter plate by a metal removing technique, but in practice this is out of the question, both because of the already stated reason of too high material costs of material and because of the additional reason of the added processing costs involved in such a metal removing process. Unitary filter press plates formed of one material can be constructed from stainless steel practically in only one way, namely that, mentioned above, which is accompanied by a dilution loss problem, having a press frame with perforated partition plates or the like welded thereto, but not in those forms, free of problems of loss through dilution, used for cast aluminium and plastic filter press plates while a filter plate can be constructed from several different materials, and thereby avoid the problem of loss through dilution there arise other problems not encountered with unitary press plates in particular the problem of different heat expansions of the various materials and related consequences. The basic object of the present invention was how, in a filter press plate of the above-mentioned type, to reduce the losses through dilution considerably, without accompanying difficulties or disadvantageous. According to the invention this object is achieved in a filter press plate of the type in question in that the partition plates serving as supporting means for the filtering material is constructed of corrosion-resistant material in such a way as to eliminate the above-mentioned interior hollow space substantially entirely having its two side faces profiled for the formation of flow-off channels for the filtrate or of adduction channels for the non-filtrate, expansion clearances being provided between this interior material and the surrounding frame walls to absorb the different heat expansions of the stainless steel forming the press frame and the interior material, the width of such clearance being at least equal to the difference between the heat expansion of the interior material and the frame. As a result of this design, on the one hand, the interior space is no longer for the most part hollow but almost filled with the corrosion-resistant material, and a substantial reduction of the losses through dilution is achieved, while on the other, difficulties arising from the difference in heat expansion of the material and of the stainless steel forming the press frame are avoided. While these clearances avoid heat expansion problems they introduce another problem which does not occur with the known cast aluminium and synthetic plastic filter press plates or with the known steel filter press plates, namely a considerable bending strain on the press frame covers. This bending strain arises from the fact that the liquid filtered or to be filtered naturally enters the clearance and therefore exerts on the inner wall of the press frame a pressure corresponding to the liquid pressure, causing a bending strain on the press frame covers. Such a bending strain does not occur with the known cast aluminium and synthetic plastic filter press plates, as these filter plates in principle consist in a unitary plate and there are inherently not present any press frame internal walls against which the liquid pressure could act. With the known steel filter press plates such a bending strain does not occur either, although the liquid pressure does act there on the press frame internal wall in the same way as with the filter plate under consideration. This is because the forces exerted upon the press frame internal wall as a result of the liquid pressure compensate for themselves through the perforated plates welded to the press frame and operating as a forcelocking connection between opposite frame sections. Because of this bending strain the dimensions of the filter press plate should be relatively small if the interior material is to be formed of a single partition plate. When the dimensions of the filter press plate under consideration are greater it is more advantageous to prevent excess bending strains by using a plurality of interior plates partition arranged side by side, and by providing between adjacent faces of said plates struts connecting opposite portions of the press frame. Where a plurality of partition plates are arranged side by side, it is advantageous, for technical production reasons for all the plates to have the same dimensions. In this case the clearances between the individual plates and the frame walls surrounding them should have the same width at least where the plates are arranged side by side in the same direction. The interior partition plates may, in the filter press plate under consideration, be similar to known aluminium casting and synthetic plastic press plates, have advantageously on both sides a ribbed surface. However, naturally, other profiles are also possible, for example a network of grooves crossing one another. As the material for the plates, synthetic plastic material is to be considered in the first place, which may in fact be a heat-resistant synthetic plastic as used for example for the known plastic filter press plate. Particularly advantageous is a glass-fibre reinforced plastic, on account of the fact that the heat expansion of glass-fibre reinforced plastic is smaller than the heat expansion of the same plastic without glass fibre reinforcement. In special cases of application, where no suitable synthetic plastics are available, e.g. at high temperatures, use may advantageously be made of ceramic instead of plastic, provided the ceramic used, is not porous. Therefore it is appropriate to use glazed ceramic. For other special applications, in particular for the filtration of spirits and similar strong alcoholic liquids, glass may be used to advantage instead of plastic. As compared with ceramic and glass, however, plastic has the advantage of being flexible and therefore easier to introduce into the filter plate.

The invention will be described in more detail hereinbelow on the basis of the attached figures illustrating one embodiment of the invention, in which.

Figure 1:
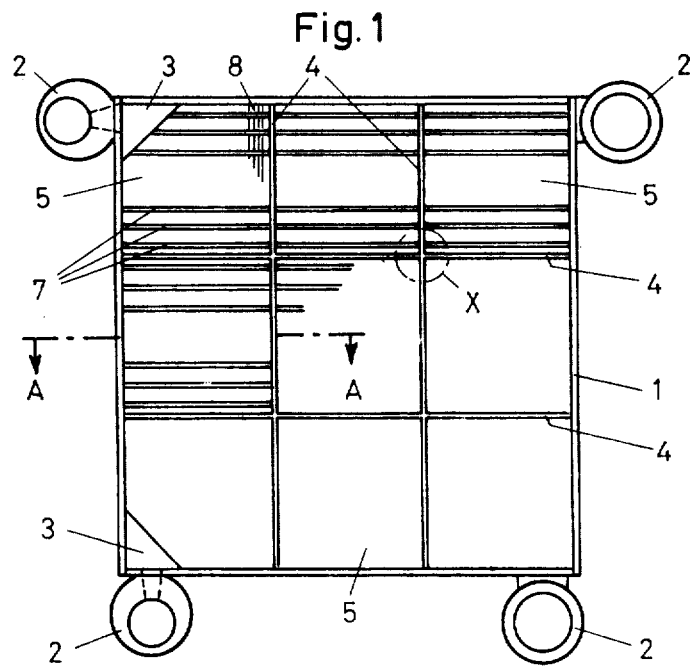
FIG. 1 is a top view of one side face of the filter press plate thereof.
Figure 2:
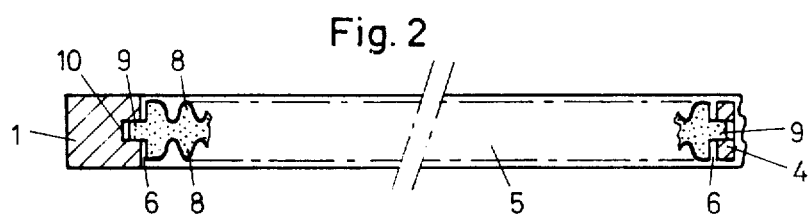
FIG. 2 is a cross-section through a portion of the filter plate shown in FIG. 1 along line A — A.
Figure 3:
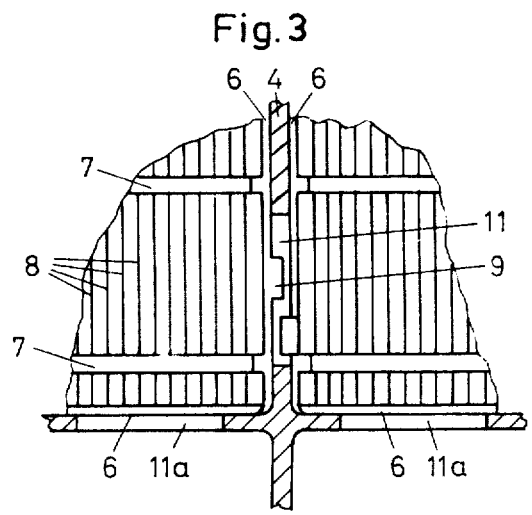
FIG. 3 is a view on an enlarged scale of a fragment with the area marked X in FIG. 1.

The embodiment of the filter press plate under consideration shown in FIG. 1 includes a press plate frame 1 of stainless steel with four welded-on eyes 2 and four corner plates 3 of stainless steel (only two of which are shown) welded in the corner areas of the press plate frame 1 to increase the bending resistance of the press plate frame, wall as usual in the art. The portions of the frame 1 lying opposite one another are joined together by means of interior struts 4. The struts 4 are welded at their ends onto the internal wall of the press frame and are made of the same stainless steel as the press edge 1 and the corner plates 3. Furthermore, the struts 4 are welded together at their points of intersection. The struts 4 and press frame 1 form, as may be seen from FIG. 1, nine quadrangular areas in each of which a synthetic plastic partition plate 5 is arranged. The walls of the struts 4 facing each such area as well as of the press frame 1, form the limiting walls encompassing each plastic partition plate 5. The length and the width of the plastic partition plates 5 are so calculated that at the maximum operational temperature of the filter plate these dimensions are at most equal to the length or width of the limiting walls encompassing them. As the heat expansion of the synthetic plastic materials under consideration (for example plastic of the "Noryl" brand, when reinforced with glass fibres, has a heat expansion of $3.6 \cdot 10^{-5}/°C$, and without glass fibre reinforcement has a heat expansion of about $6 \cdot 10^{-5}/°C$) is generally greater than the heat expansion of stainless steel (approx. $1.6 \cdot 10^{-5}/°C$), with such dimensions for the synthetic plastic partition plates 5; obviously assuming that the maximum operational temperature lies above the normal room temperature; clearance spaces will be created between the sides of the synthetic plastic plate 5 and the limiting walls encompassing the same plastic plate 5, when the temperature recedes from the maximum operational temperature to room temperature. It should be mentioned in this connection that the phrase "maximum operational temperature" in the present case is intended to mean the maximum possible or permissible temperature encountered during the various possible ways of using a filter, e.g. filtration cleaning, sterilisation, and not just the maximum possible operating temperature. For example the temperature when using the filter may be substantially room temperature, i.e. about 20° C, while, on the other hand, when sterilising the filter with hot steam, temperatures of e.g. up to 120° C may arise. The "maximum operational temperature" would in that case be 120° C, provided that with other ways of using the filter, e.g. when cleaning still higher temperatures are not used. The clearances 6 provided between the limiting walls and a synthetic plastic partition plate 5 in normal conditions, that is to say at room temperature can be clearly seen in the cross-section shown in FIG. 2 and also in FIG. 3. An additional comment may be made about FIG. 2 in that the cross-section through the plastic plate 5 continues across the entire plate. The synthetic plastic partition plates are individually constructed as follows: Both side faces of the synthetic plastic plates, which stand vertically when in operational position, are, as may be seen in FIGS. 1 and 3, ribbed in the vertical direction, and in the horizontal direction may be provided with a series of spaced grooves 7 forming channels. The design of the ribs 8 of the ribbing extending in the vertical direction may be clearly seen from the cross-section shown in FIG. 2. The width of the ribs, or the distance from one rib crest to the adjacent rib crest should not exceed 4 mm, so that a good seating of the filter layers is ensured thereby. For the same reason also the width of the grooves 7 should not exceed 4 mm. In operation, the layers of filtering material lie on the rib crests of the synthetic plastic partition plates 5 and are supported by them.

For attachment inside each division of the grating formed by the press frame 1 and the struts 4, the synthetic plastic partition plates 5 are provided on two opposite sides with lugs or projections 9 which engage corresponding recesses 10 and 11 in the press frame 1 or the struts 4. For insertion of such plate 5 into a division of the grating formed by the press edge 1 and the struts 4, the synthetic plastic partition plate is first inserted on one side with its lugs 9 into the associated recesses 10 or 11, and then slightly bent, until also the lugs 9 disposed on the other side can be snapped into the corresponding recesses 10 and 11. When the plates 5 are constituted of glazed ceramic or glass, this same mode of insertion is not possible, as glass and ceramic are brittle and cannot be bent. In this case provision must be made above the recesses 11 in the struts 4 for a closure piece which is removable and subsequently re-insertable and fixable, e.g. by screws, to the struts 4. The length of the sides of the partition plates 5 should appropriately lie between 20 and 40 cm, and in any case not substantially exceed 40 cm. There are two reasons for this: The main reason is that the distances between the press edge 1 and the struts 4, or between adjacent struts should not substantially be greater than 40 cm, so that the bending force exerted by the liquid pressure upon the press frame, or the deflection under load of the press frame caused by this bending force, should remain negligibly small, and also the bending couple exerted on the covers of the press frame does not become too great. A further reason is the production costs for these plates. The costs of die casting molds for smaller partition plates are considerably lower than for relatively bigger plates. It is therefore recommended, both for reasons of stability and in order to keep the cost of production down, to choose the smaller grating distance when there is a choice. On the other hand where the extra expenditure of time and money for the welding of the struts 4 with the press edge 1, as well as one with the other at their points of intersection, become greater than the savings in molding larger plates 5, then the latter may be preferable. During operation of the filter press plate under consideration, the liquid flowing in the grooves 7, for example from left to right in FIG. 3, flows through the recesses 11 in the struts 4 in the area of the adjacent plate 5. The recesses 11 in the struts 4 act therefore not only for the engagement of the lugs 9 on partition plates 5 but also as throughflow channels for the connection of adjacent divisions of the grating formed by the press frame 1 and the struts 4. For this reason, and as may be seen in FIG. 3, additional recesses 11a are provided on the horizontally-extending struts 4, although the partition plates 5 do not carry lugs for engaging the recesses 11a. The filter press plate under consideration has, as compared with the known steel filter press plates mentioned hereinabove, not only the advantage of avoiding losses through dilution, also the further advantage that its overall production costs are considerably lower than for a known steel filter press plate of the same size. This is the result in the first instance of the savings which are achieved by doing away with the perforated partition plates and with the welding thereof with the press edge. As compared with known cast aluminium filter press plates, the filter press plates of the invention have the advantage that they exhibit no propensity to corrosion of any kind, and in terms of overall production costs cost slightly more than those of the cast aluminium filter press plates of comparable size. Compared with the known all synthetic plastic filter press plates, the advantage of the present filter press plate is its considerably higher mechanical stability, which corresponds practically to the mechanical stability of the known steel filter press plates, and the complete elimination of the danger present with all known synthetic plastic press plates of breaking off the eyes and hanging tabs as a consequence of careless handling in operation.

I claim:

1. A filter press plate for layer and settling layer filters comprising a frame of stainless steel which defines at least one internal area, said frame having exteriorly projecting hollow eyes forming when a plurality of elements are stacked together in use manifolds for supplying and removing the liquid being filtered and passages connecting the interior of said eyes with the internal area of the frame, and within said internal area at least one separate partition plate of corrosion resistant material for supporting the filtering material, each said at least one partition plate extending over substantially the entirety of the corresponding internal area and being spaced along its exterior edges from the adjacent interior edges of said frame a distance sufficient to accommodate any difference in the heat expansions of said at least one plate and frame at the maximum temperature to which the filter press plate is to be exposed, each said at least one partition plate and frame having cooperating lugs and recesses on their adjacent exterior and interior edges for detachably securing the plate within the frame, each said at least one partition plate having its side faces profiled to form channels for supplying and removing the liquid being filtered.

2. A filter press plate according to claim 1, wherein the frame defines a single internal area which is substantially filled by a single one of said at least one partition plate.

3. A filter press plate according to claim 1, wherein the frame includes interior struts extending between opposite sides and defining a plurality of internal areas and a plurality of said at least one partition plate (5) are disposed one within each of said areas.

4. A filter press plate according to claim 3, wherein all the partition plates (5) have the same dimensions and are separated along their exterior edges and the corresponding interior frame edges by equal distances.

5. A filter press plate according to claim 1, wherein said faces are profiled in the form of ribs.

6. A filter press plate according to claim 1, wherein the said at least one partition place material is synthetic plastic.

7. A filter press plate according to claim 6, wherein the synthetic plastic is reinforced with glass fibers.

8. A filter press plate according to claim 1, wherein said at least one partition plate material is glazed ceramic.

9. A filter press plate according to claim 1, wherein the said at least one partition plate material is glass.

* * * * *